(12) United States Patent
Chen

(10) Patent No.: US 8,985,616 B1
(45) Date of Patent: Mar. 24, 2015

(54) BABY STROLLER CAPABLE OF BEING FOLDED WITH ONE HAND

(71) Applicant: Yong Xiang Chen, Zhongshan (CN)

(72) Inventor: Yong Xiang Chen, Zhongshan (CN)

( * ) Notice: Subject to any disclaimer, the term of this patent is extended or adjusted under 35 U.S.C. 154(b) by 0 days.

(21) Appl. No.: 14/312,696

(22) Filed: Jun. 24, 2014

(51) Int. Cl.
*B62B 7/06* (2006.01)
*B62B 7/08* (2006.01)

(52) U.S. Cl.
CPC ..................................... *B62B 7/062* (2013.01)
USPC ........... 280/642; 280/647; 280/650; 280/658; 280/47.38

(58) Field of Classification Search
USPC ........................ 280/642, 647, 650, 658, 47.38
See application file for complete search history.

(56) References Cited

U.S. PATENT DOCUMENTS

2014/0339793 A1* 11/2014 Xu ................................ 280/650

\* cited by examiner

*Primary Examiner* — Hau Phan
*Assistant Examiner* — Bryan Evans

(57) ABSTRACT

The utility model provides a baby stroller capable of be folded with one hand, which comprises a comprise a joint seat, an upper joint, a lower joint, an annular pressing block, a lock device being used in the lower joint and the upper joint to avoid rotating among the lower joint, a folding device being used to control the lock device for locking or releasing the upper joint and the lower joint, wherein the folding device comprises a connecting seat, a lever, a wire and a lifting belt; the connecting seat is provided with first release components to control and lock the lever in case of movement. The present invention can fold the baby stroller by one hand, and the operation is very convenient, flexible, and effortless.

10 Claims, 10 Drawing Sheets

BABY STROLLER CAPABLE OF BEING FOLDED WITH ONE HAND

FIELD OF THE INVENTION

The utility model relates to a baby stroller product, especially to a baby stroller capable of being folded with one hand.

BACKGROUND OF THE INVENTION

The baby stroller is a moving tool for carrying a baby, it is convenient for parents to bring their baby when they go out, so that the baby stroller is very popular for consumers.

At present, the baby stroller comprises a stroller frame, a seat fixed at the stroller frame, a front wheels arranged below the stroller frame, a handle bar arranged on the stroller frame, wherein the stroller frame comprises a joint components, a front pipe disposed on the joint components, a handle pipe, a rear pipe, front wheels and rear wheels. The stroller can be folded when not in use, so the joint components is provided with a folding mechanism for the control of fold and unfold. But, the baby stroller need to operate with two hands, and need more power to operate, so it is not easy and not smooth to use.

In view of the disadvantages, the utility model is realized by the following technical scheme.

SUMMARY OF INVENTION

The purpose of the present invention is to overcome the disadvantages and to provide a baby stroller capable of being folded with one hand, it is very convenient, flexible, and effortless in operation.

In order to solve the above problems, the technical scheme of the present invention is that a baby stroller capable of being folded with one hand comprises joint components, and a front pipe, a handle pipe and a rear pipe, whereof all are arranged at the joint components;

which is characterized in that the joint components comprise a joint seat, an upper joint and a lower joint, which are arranged at the joint seat and rotated with each other, and an annular pressing block disposed between the upper joint and the lower joint; the upper joint and lower joint are respectively disposed on one end of the handle pipe and the front pipe, the joint seat is provided with a lock device being used in the lower joint and the upper joint to avoid rotating among the lower joint, the upper joint and the annular pressing block; the joint seat whereof a lower end is further provided with a folding device being used to control the lock device for locking or releasing the upper joint and the lower joint, wherein the folding device comprises a connecting seat arranged on the rear pipe, a lever connected pivotally to the connecting seat, a wire whereof one end is connected with a lower end of the lock device and whereof the other end is connected with a front end of the lever, and a lifting belt connecting with a rear end of the lever; the connecting seat is provided with first release components to control and lock the lever in case of movement; the baby stroller is being folded by raising the lifting belt to drive the lever rolling back the wire resulted in the lock device being moved downward for releasing upper joint and lower joint, and collapsing into a flattened position with weights thereof.

More preferably, the lock device comprises a sleeve arranged on the joint seat and position below the upper joint and the lower joint, a spring disposed inside the sleeve and a pin positioned at an upper of the sleeve for locking the upper joint and the lower joint, one end of the lever being connected with the sleeve; the upper joint and the lower joint whereof lower ends are respectively provided with a first slot and a second slot matched with the pin, and the pin is also matched with an aperture arranged on for locking the upper joint and the lower joint.

More preferably, the joint seat comprises a base, a first connecting board and a second connecting board disposed on two sides of an upper part of the base, and an installation space arranged between the first connecting board and the second connecting board for receiving the upper joint, the annular pressing block and the lower joint; the upper joint and the lower joint are respectively provided with a first sliding opening and a second sliding opening; when in installation, the annular pressing block is mounted to the upper joint and the lower joint, and embedded on the installation space, then fixed by rivets passing through the first connecting board, the first sliding opening of the upper joint, a through hole of the annular pressing block, the second sliding opening of the lower joint and the second connecting board in sequence.

More preferably, the sleeve is provided with a space for receiving the spring and a notch disposed below the space; the base is provided with a sliding room communicated with the installation space and received the sleeve, and an orifice corresponded to a lower part of the sleeve and arranged on the notch, a bolt passed through the orifice and the notch, and fixed in the base, wherein the bolt is being abutted on a lower end of the spring.

More preferably, the lower joint corresponded to the upper joint is provided with a first containing groove and a first convex ring, the annular pressing block inserted into the first convex ring and fitted in the first containing groove.

More preferably, the first containing groove whereof inner wall is provided with a first flange having a first helical groove; the annular pressing block whereof outer wall is provided with a first convex rib matched with the first helical groove.

More preferably, the first convex ring whereof outside is provided with a second helical groove in the opposite direction to the first helical groove; the annular pressing block whereof inner wall is provided with a second convex ring matched with the second helical groove.

More preferably, the first release components comprises a left cover and a right cover that is arranged on the connecting seat and matched to each other, a curb piece used to control the lever to prevent movement, a first button used to drive the curb piece locking or releasing from the lever, a first spring arranged between the curb piece and the left cover, a second spring arranged on the first button, and a block used to control the lever to prevent movement; a third slot and a fourth slot are respectively arranged on the front end of the curb piece and the first button.

More preferably, the lever whereof front end is further provided with a wire trench matched with the wire.

More preferably, the joint seat whereof outside is further provided with an outer case and inner case for covering the joint seat thereof; the outer case whereof an outside is provided with a lid having a plurality of buckles thereon and holes matched with the buckles.

According to above technical scheme, the advantages of the present invention are as follow: when collapsing the stroller, pressing the first button of the first release components with one hand caused the block and the curb piece releasing the third slot and the fourth slot, at this moment, raising the lifting belt with one hand drives the lever rolling back the wire that the lock device is being moved downward for releasing upper joint and lower joint, and the stroller moving down with weights thereof, so as to facilitate folding process. To sum up, the present invention can fold the baby stroller by one hand, and the operation is very convenient, flexible, and effortless.

When you need to reopen the stroller, to hold the handle pipe makes the lower joint relative to the upper joint to be opened with the assistance of the annular pressing block, until the first slot of the upper joint and the second slot of the lower joint are overlapped, at this point, the sleeve of the lock device moves upward by the spring caused the pin inserted into the first slot of the upper joint and the second slot of the lower joint, the stroller is fully opened.

DETAILED DESCRIPTION OF THE PREFERRED EMBODIMENTS

Figure 1:
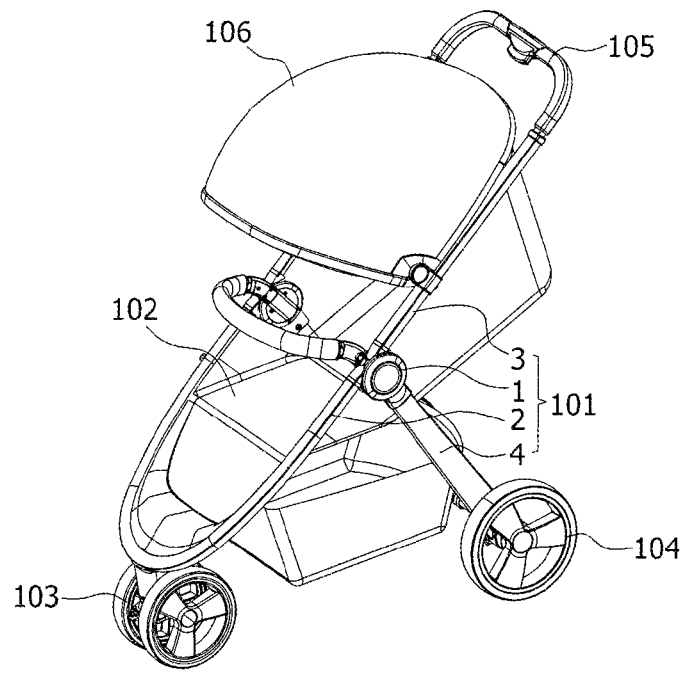
FIG. 1 is a perspective view of the utility model.
Figure 2:
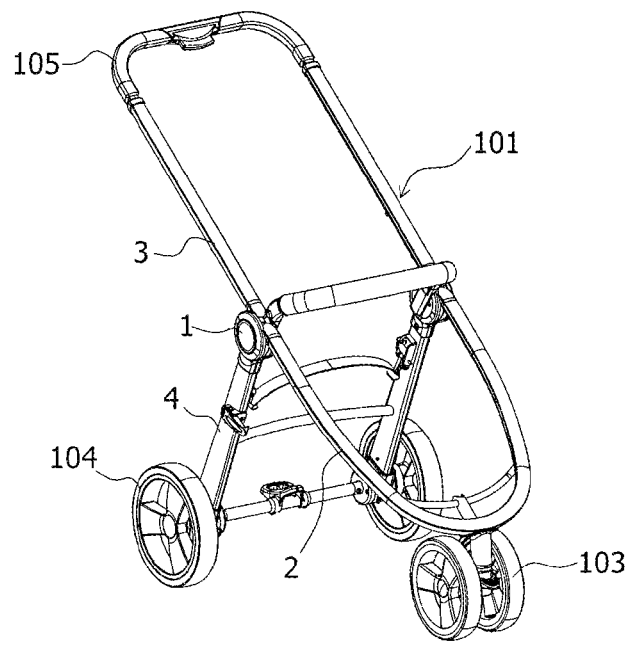
FIG. 2 is a schematic view showing a baby stroller frame of the utility model.
Figure 3:
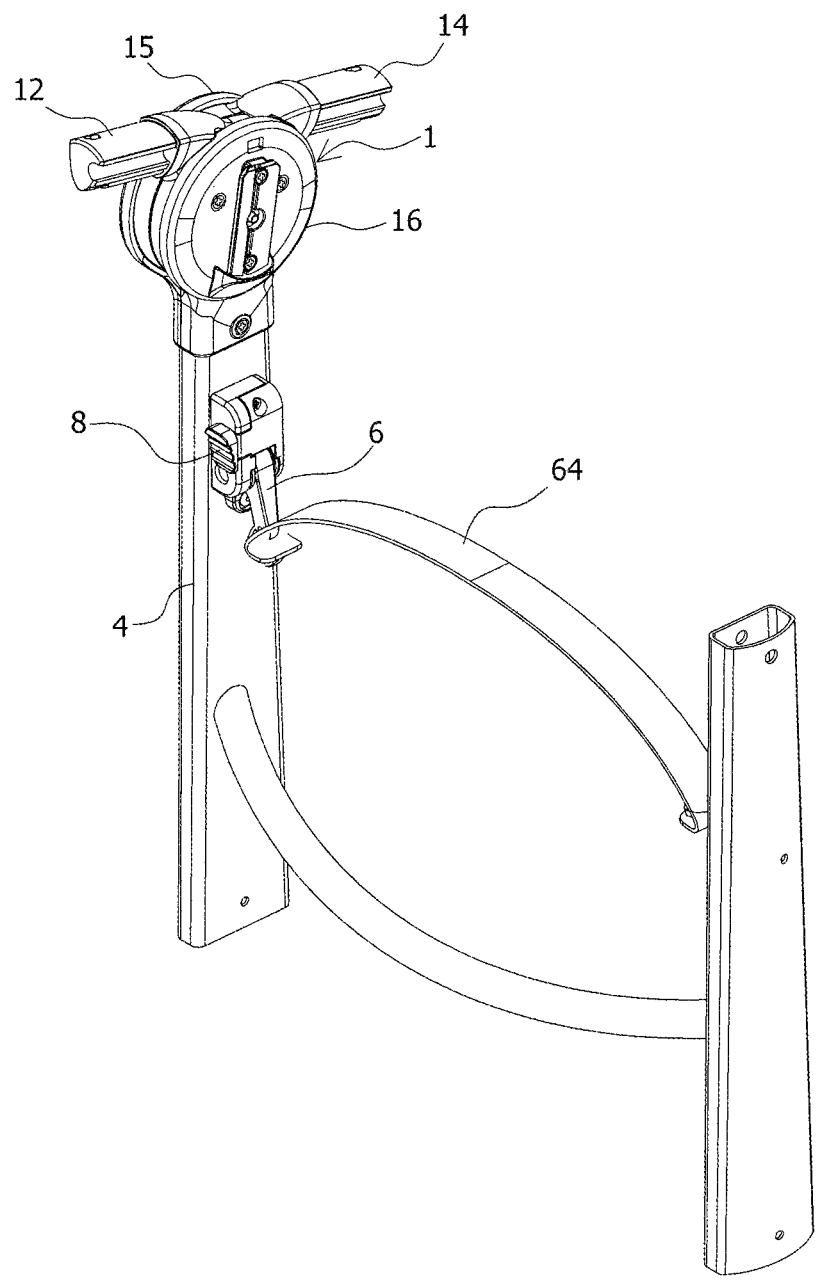
FIG. 3 is a perspective view showing joint components of the utility model.
Figure 4:
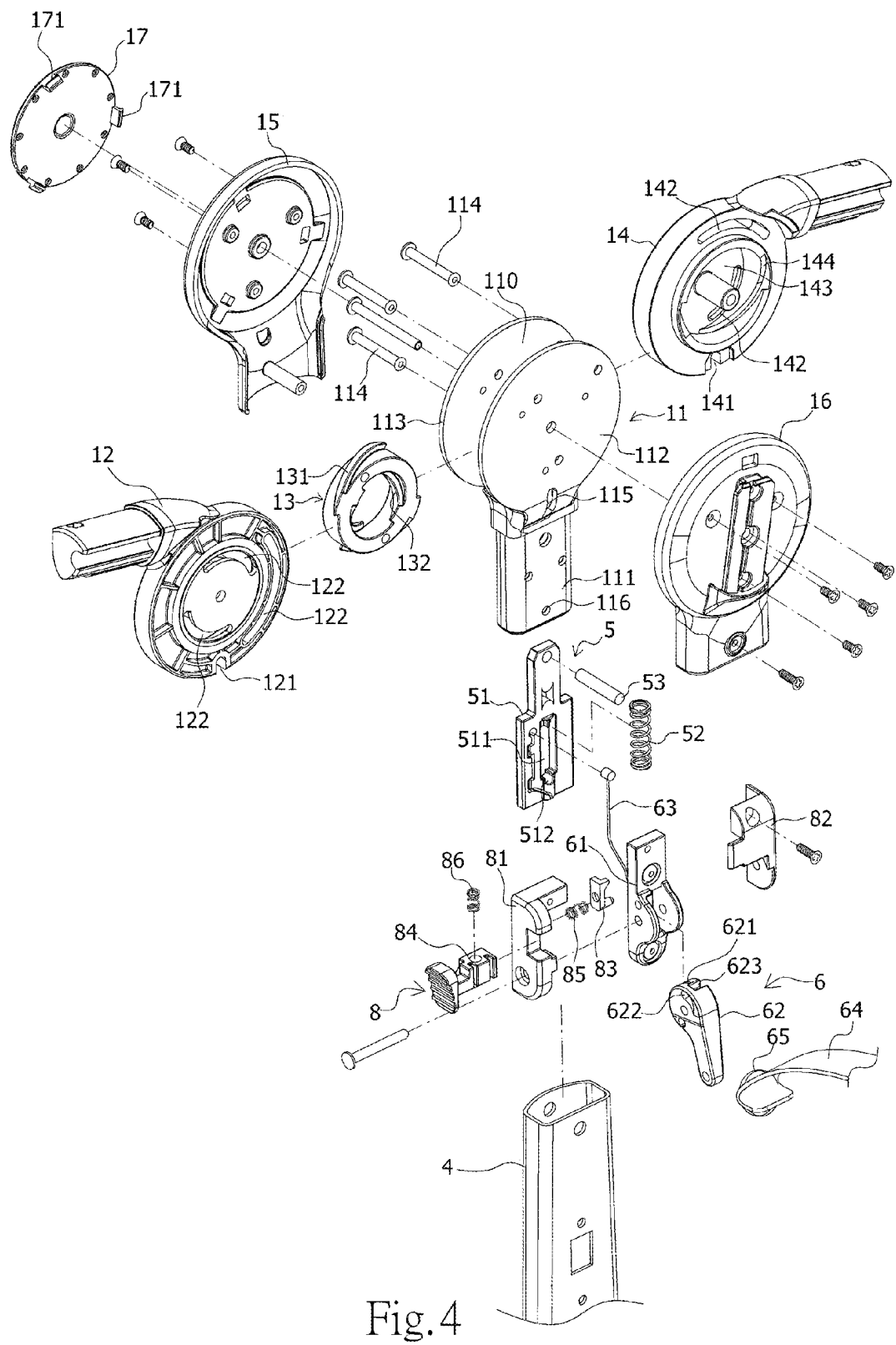
FIG. 4 is an exploded view of the FIG. 3.
Figure 5:
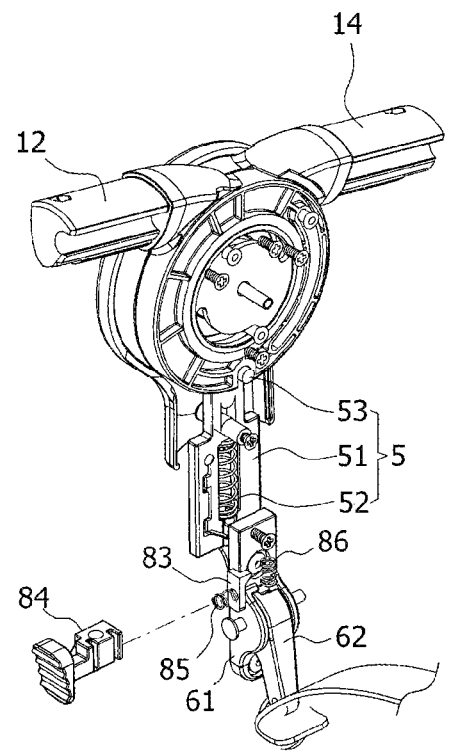
FIG. 5 is a schematic view showing joint components of the utility model.
Figure 6:
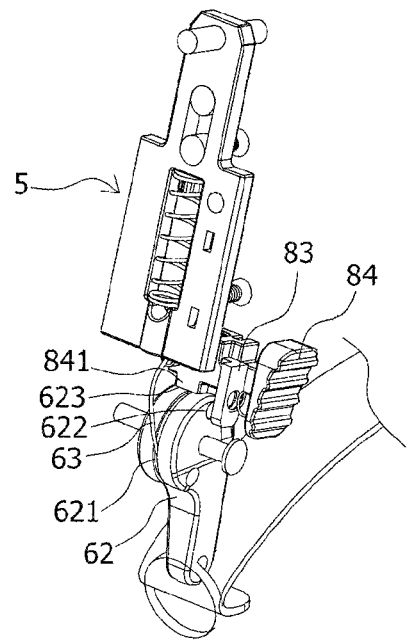
FIG. 6 is a schematic view showing a lock device and a folding device of the utility model.
Figure 7:
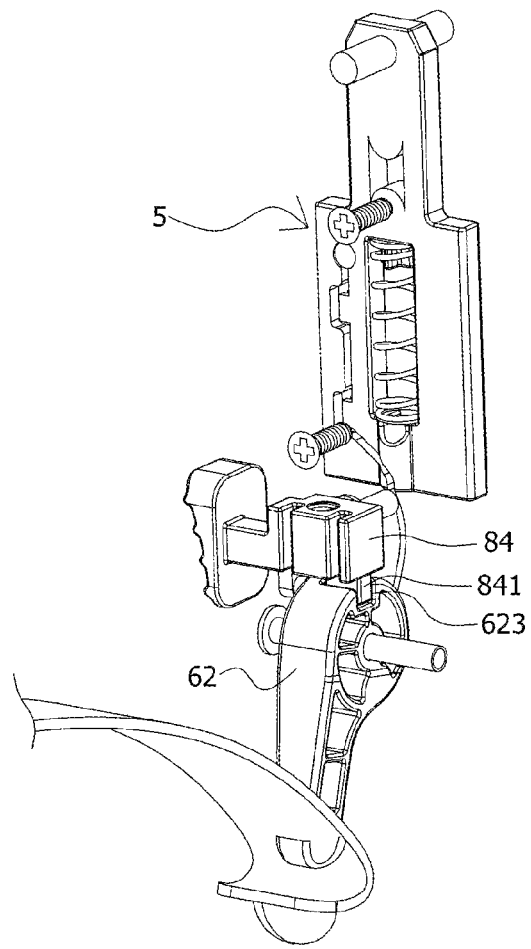
FIG. 7 is another schematic view of the FIG. 6.
Figure 8:
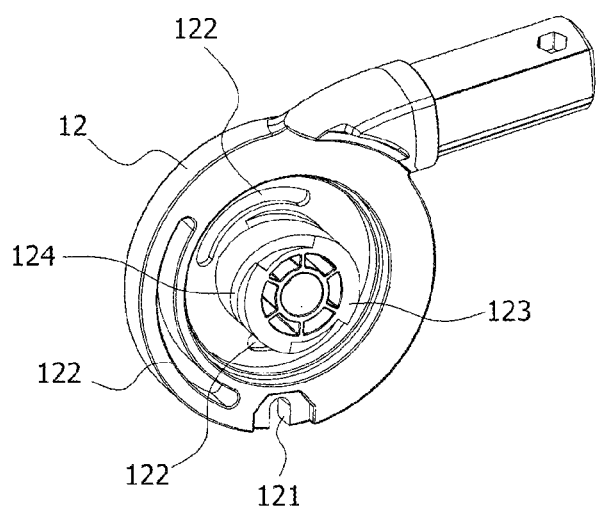
FIG. 8 is perspective view of an upper joint of the utility model.

A baby stroller capable of being folded with one hand as shown in FIGS. 1 to 8 comprises a frame (101), a seat (102) fixed at the frame (101), front wheels (103) and rear wheels (104) arranged below the frame (101) and a handle bar (105) arranged on the frame (101), and the frame also provided with a sunshade (106).

The frame (101) comprises joint components (1), and a front pipe (2), a handle pipe (3) and a rear pipe (4), wherein the front wheels (103), the rear wheels (104) and the handle bar (105) are respectively arranged on the front so pipe (2), the rear pipe (4) and the handle pipe (3).

The joint components (3) comprise a joint seat (11), an upper joint (12) and a lower joint (12), which are arranged at the joint seat (11) and rotated with each other, and an annular pressing block (13) disposed between the upper joint (12) and the lower joint (14); the upper joint (12) and lower joint (14) are respectively disposed on one end of the handle pipe (3) and the front pipe (2), the joint seat (11) is provided with a lock device (5) being used in the lower joint (14) and the upper joint (12) to avoid rotating among the lower joint (14), the upper joint (12) and the annular pressing block (13); the joint seat (11) whereof a lower end is further provided with a folding device (6) being used to control the lock device (5) for locking or releasing the upper joint (12) and the lower joint (14).

The joint seat (11) comprises a base (111), a first connecting board (112) and a second connecting board (113) disposed on two sides of an upper part of the base (111), and an installation space (110) arranged between the first connecting board (112) and the second connecting board (113) for receiving the upper joint (12), the annular pressing block (13) and the lower joint (14); the upper joint (12) and the lower joint (14) are respectively provided with a first sliding opening (122) and a second sliding opening (142); when in installation, the annular pressing block (13) is mounted to the upper joint (12) and the lower joint (14), and embedded on the installation space (110), then fixed by rivets (114) passing through the first connecting board (112), the first sliding opening (122) of the upper joint (12), a through hole of the annular pressing block (13), the second sliding opening (142) of the lower joint (14) and the second connecting board (113) in sequence so that make the upper joint (12) can interact with the lower joint (14).

The lower joint (14) corresponded to the upper joint (12) is provided with a first containing groove (143) and a first convex ring (123), the annular pressing block (13) inserted into the first convex ring (123) and fitted in the first containing groove (143). Wherein the first containing groove (143) whereof inner wall is provided with a first flange (144) having a first helical groove; the annular pressing block (13) whereof outer wall is provided with a first convex rib (131) matched with the first helical groove; the first convex ring (123) whereof outside is provided with a second helical groove in the opposite direction to the first helical groove; the annular pressing block (13) whereof inner wall is provided with a second convex ring (132) matched with the second helical groove.

The joint seat (11) whereof outside is further provided with an outer case (15) and inner case (16) for covering the joint seat (11) thereof, which can protect the joint seat (11).

The outer case (15) whereof an outside is provided with a lid (17) having a plurality of buckles (171) thereon and holes matched with the buckles (171), wherein the buckles (171) can stable the assembly and decorate for beauty.

Wherein the folding device (6) comprises a connecting seat (61) arranged on the rear pipe (4), a lever (62) connected pivotally to the connecting seat (61), a wire (63) whereof one end is connected with a lower end of the lock device (5) and whereof the other end is connected with a front end of the lever (62), and a lifting belt (62) connecting with a rear end of the lever (62); the connecting seat (61) is provided with first release components (8) to control and lock the lever (62) in case of movement; the baby stroller is being folded by raising the lifting belt (64) to drive the lever (62) rolling back the wire (63) resulted in the lock device (5) being moved downward for releasing upper joint (12) and lower joint (14), and collapsing into a flattened position with weights thereof.

The lever (62) whereof front end is a round shape structure, and is provided with a wire trench (621) matched with the wire (63) so as to facilitate rolling back the wire (63). The rear end of the lever (62) and the lifting belt (64) is provided with a pull ring (65) connected therebetween.

The lock device (5) comprises a sleeve (51) arranged on the joint seat (11) and position below the upper joint (12) and the lower joint (14), a spring (52) disposed inside the sleeve (5) and a pin (53) positioned at an upper of the sleeve (51) for locking the upper joint (12) and the lower joint (14), one end of the lever being connected with the sleeve (51); the upper joint (12) and the lower joint (14) whereof lower ends are respectively provided with a first slot (121) and a second slot (141) matched with the pin (53), and the pin (53) is also matched with an aperture (115) arranged on for locking the upper joint (12) and the lower joint (14), the sleeve (51) is provided with a space (511) for receiving the spring (52) and a notch (512) disposed below the the space (511); the base (111) is provided with a sliding room communicated with the installation space (110) and received the sleeve (51), and an orifice (116) corresponded to a lower part of the sleeve (51) and arranged on the notch (512), a bolt passed through the orifice (116) and the notch (512), and fixed in the base (111), wherein the bolt is being abutted on a lower end of the spring (52), which caused the sleeve (51) abut on the upper part by the spring (52), and fixed the pin (53) with the first slot (121) of the upper joint (12) and the second slot (141) of the lower joint (14).

The connecting seat (61) is provided with first release components (8) to control and lock the lever (62) in case of movement, so that the utility model is more safety.

The first release components (8) comprises a left cover (81) and a right cover (82) that is arranged on the connecting seat (61) and matched to each other, a curb piece (83) used to control the lever (62) to prevent movement, a first button (84) used to drive the curb piece locking or releasing from the lever (62), a first spring (85) arranged between the curb piece (83) and the left cover (81), a second spring (86) arranged on the first button (84), and a block (841) used to control the lever (62) to prevent movement; a third slot (622) and a fourth slot (623) are respectively arranged on the front end of the curb piece (83) and the first button (84).

Figure 9:
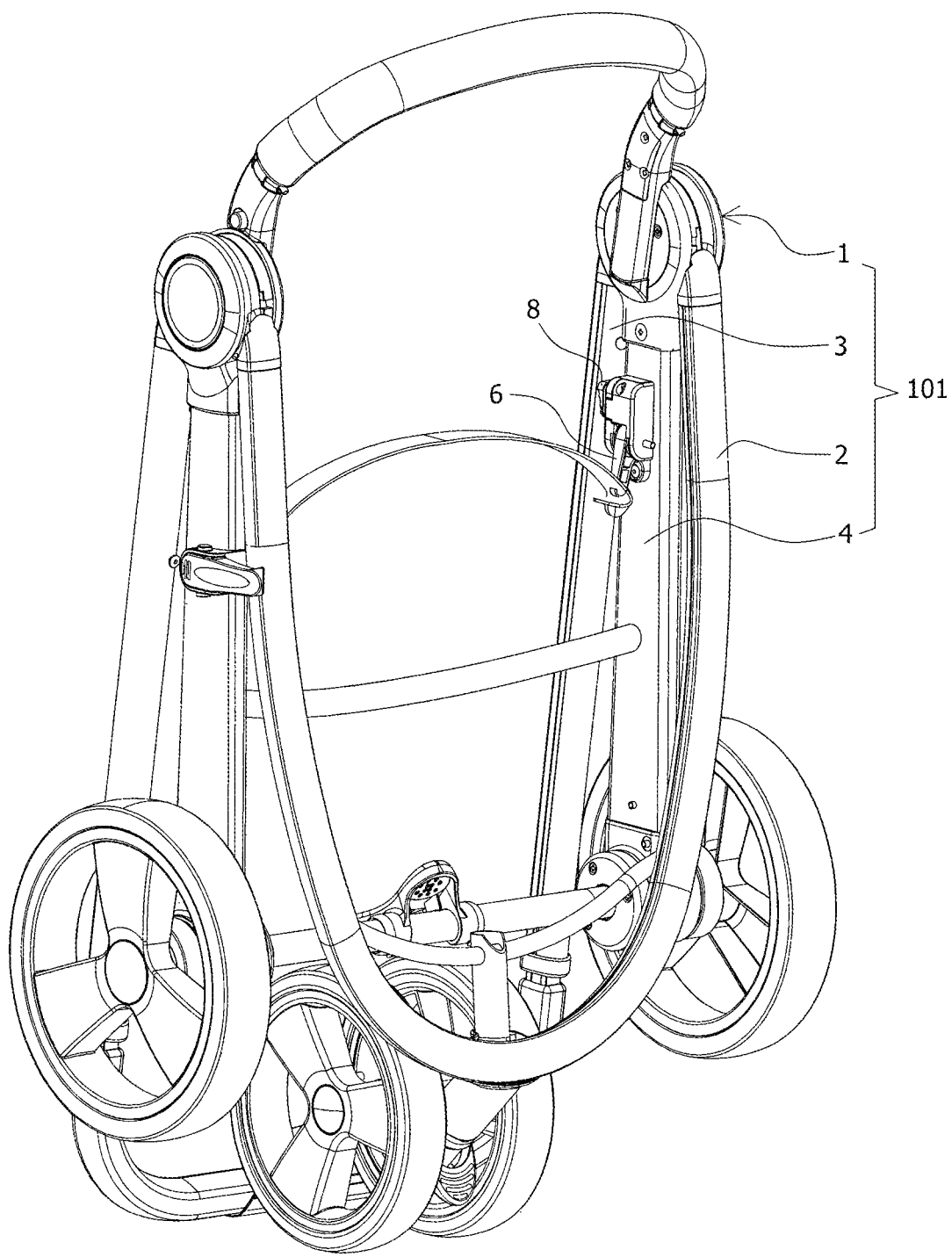
FIG. 9 is a perspective view of FIG. 2 of the folded stroller.
Figure 10:
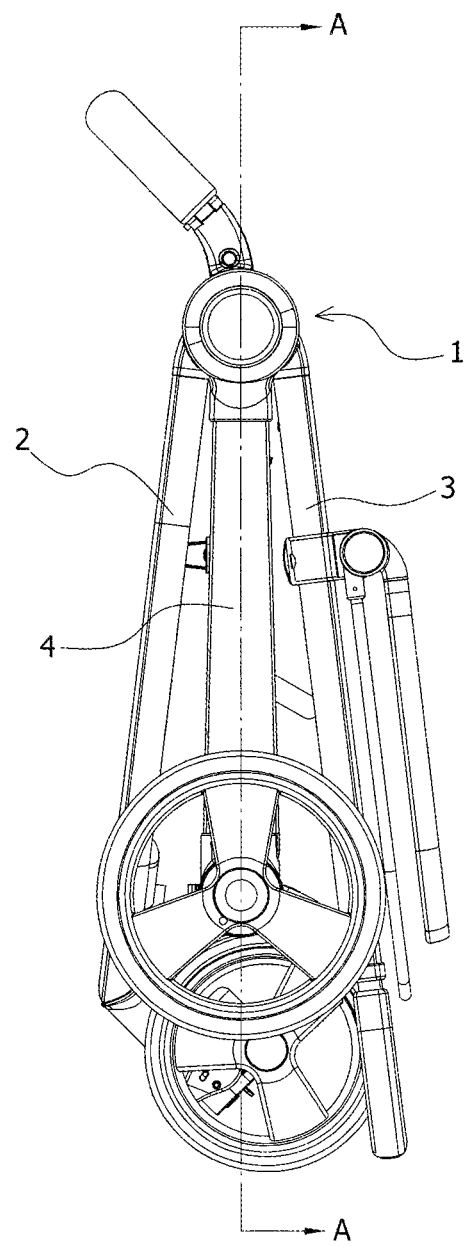
FIG. 10 is a side elevational view of the folded stroller.
Figure 11:
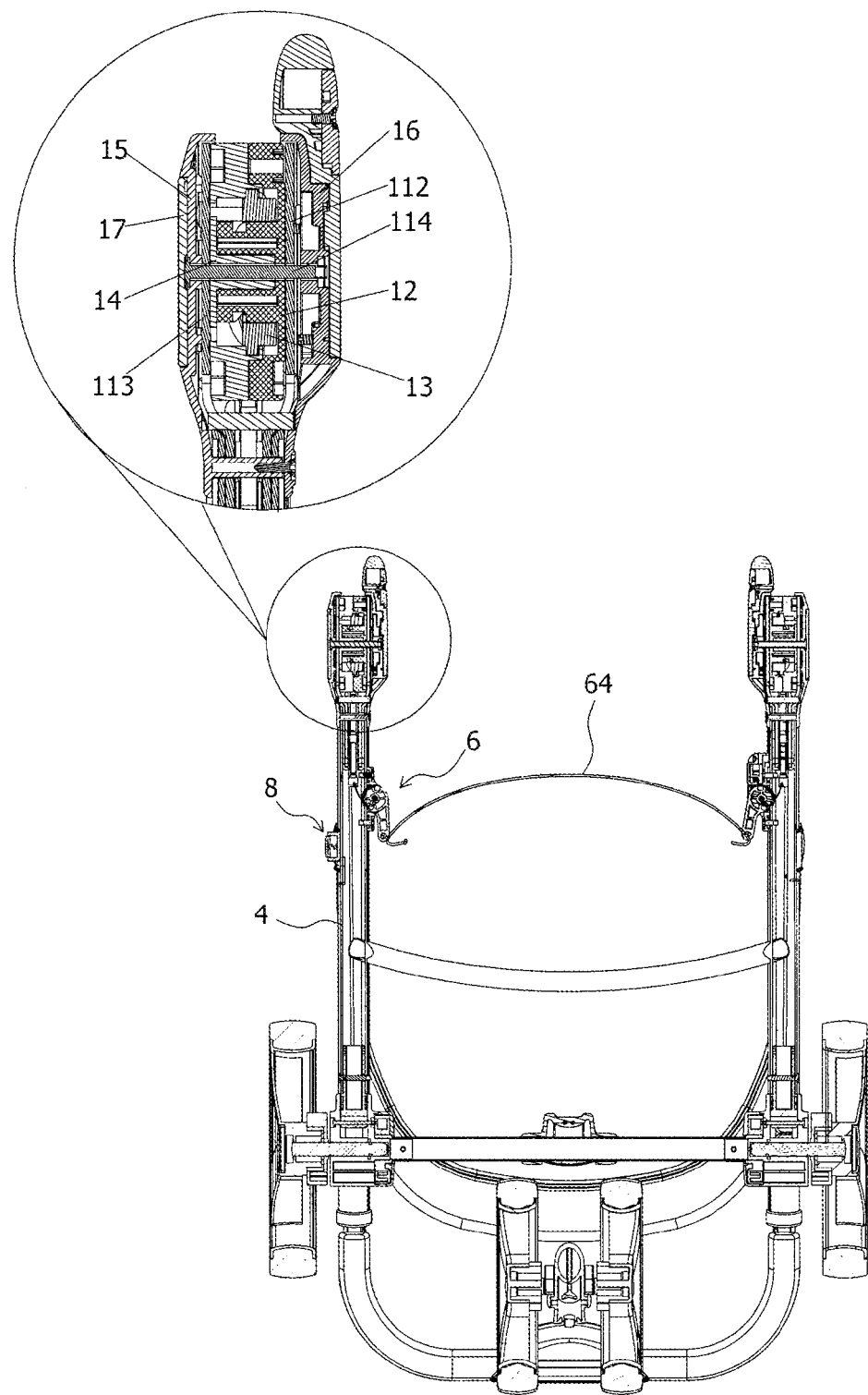
FIG. 11 is a cross section view of the A-A in FIG. 10.

When collapsing the stroller, pressing the first button of the first release components with one hand caused the block (841) and the curb piece (83) releasing the third slot (623) and the fourth slot (624), at this moment, raising the lifting belt (64) with one hand drives the lever (62) rolling back the wire (63) resulted in the sleeve (51) of the lock device (5) being moved downward for releasing upper joint (12) and lower joint (14). At this point, the upper joint (12) and the lower joint (14) are rotated mutually by the weight of the stroller thereof, more specifically, the lower joint (14) is be moved in a straight line through the first helical groove to drive the annular pressing block (13) disposed inside the base (111), and the annular pressing block (13) drives the upper joint (12) to rotate through the second convex ring (132), so as to facilitate folding process as shown in FIG. 9-11. To sum up, the present invention can fold the baby stroller by one hand, and the operation is very convenient, flexible, and effortless.

Figure 12:
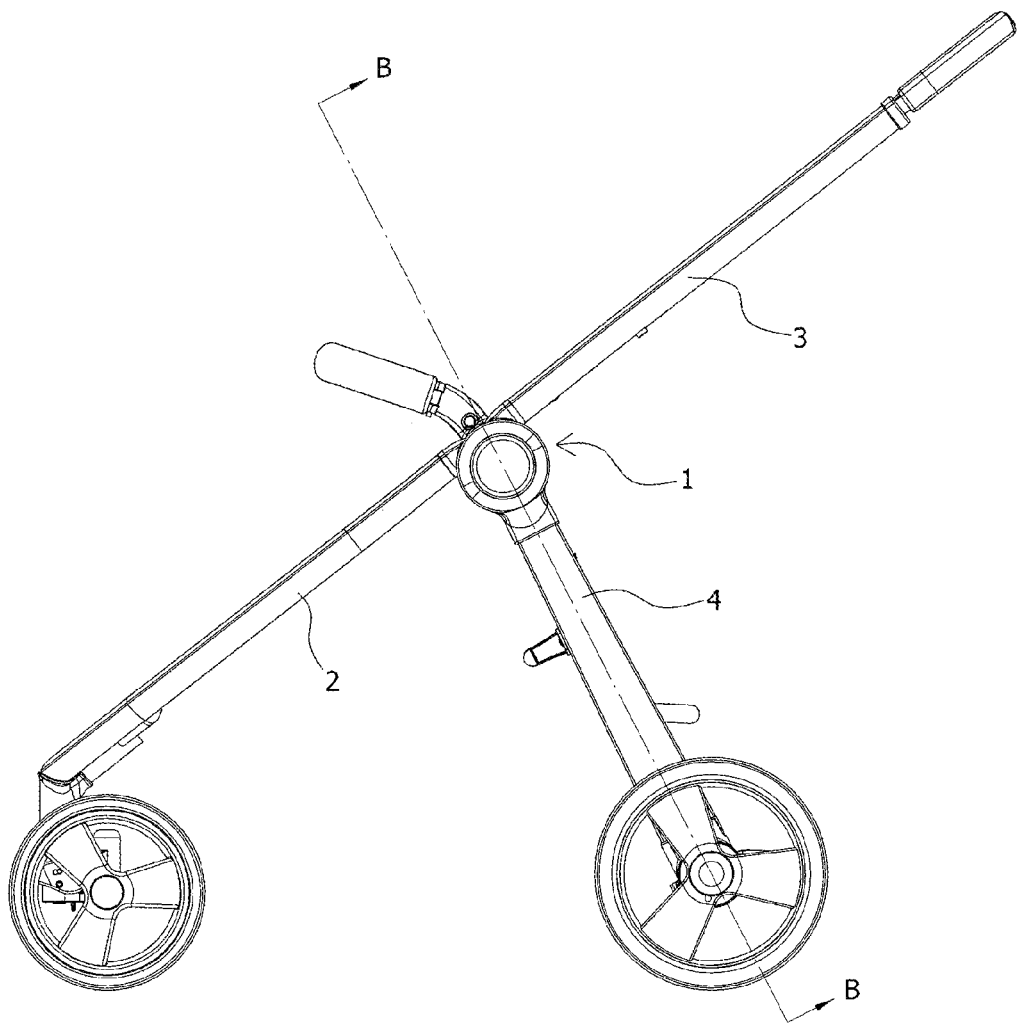
FIG. 12 is a side view of the unfolded stroller of the utility model.
Figure 13:
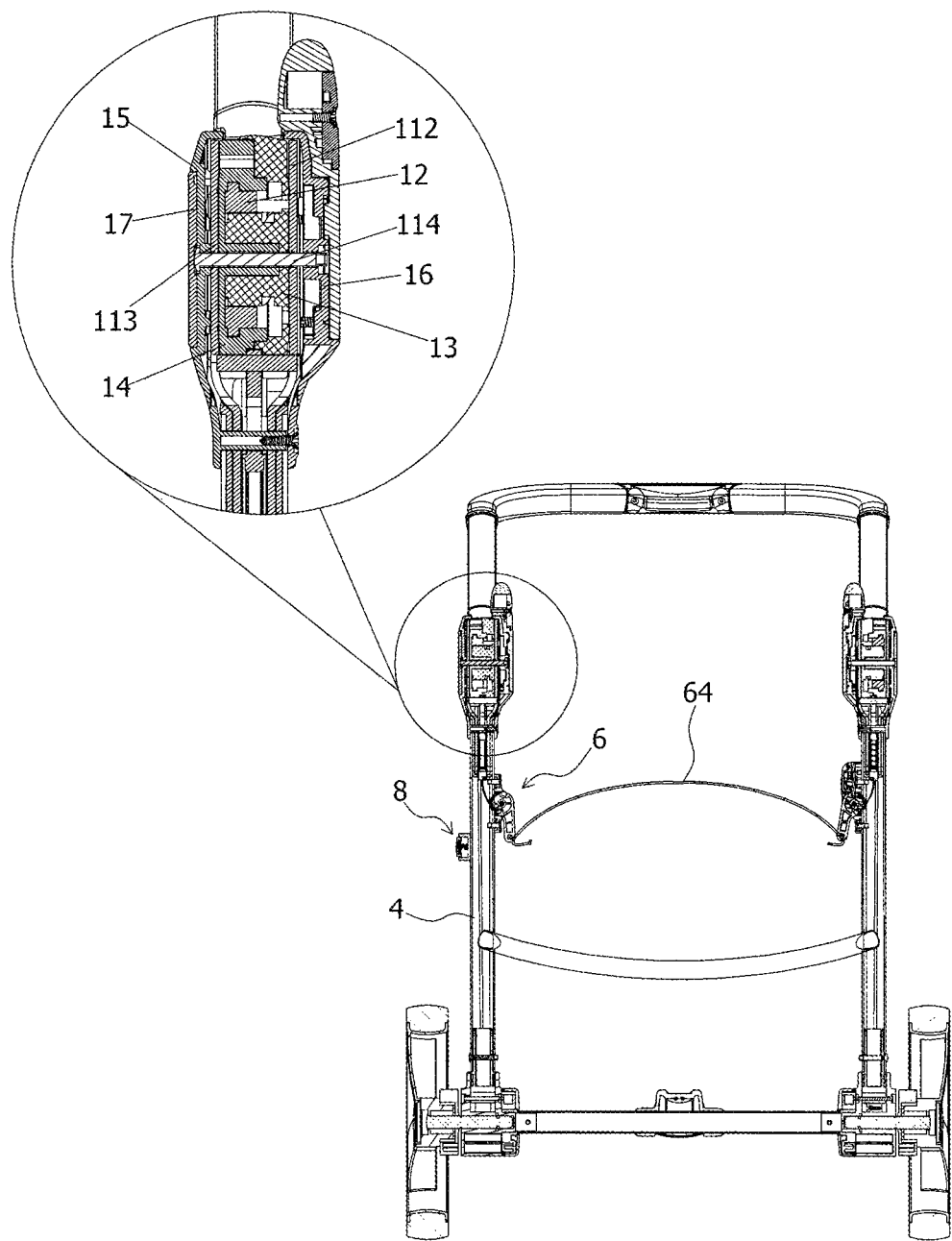
FIG. 13 is a cross section of the B-B in FIG. 12.

When you need to reopen the stroller, to hold the handle pipe makes the lower joint (14) relative to the upper joint (12) to be opened with the assistance of the annular pressing block (13), until the first slot (121) of the upper joint (12) and the second slot (141) of the lower joint (14) are overlapped, at this point, the sleeve (51) of the lock device (5) moves upward by the spring (52) caused the pin (3) inserted into the first slot (121) of the upper joint (12) and the second slot (141) of the lower joint (14), the stroller is fully opened shown as FIG. 12 and FIG. 13.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A baby stroller capable of being folded with one hand comprises joint components (1), and a front pipe (2), a handle pipe (3) and a rear pipe (4), whereof all are arranged at the joint components (1);

which is characterized in that the joint components (3) comprise a joint seat (11), an upper joint (12) and a lower joint (14), which are arranged at the joint seat (11) and rotated with each other, and an annular pressing block (13) disposed between the upper joint (12) and the lower joint (14); the upper joint (12) and lower joint (14) are respectively disposed on one end of the handle pipe (3) and the front pipe (2), the joint seat (11) is provided with a lock device (5) being used in the lower joint (14) and the upper joint (12) to avoid rotating among the lower joint (14), the upper joint (12) and the annular pressing block (13); the joint seat (11) whereof a lower end is further provided with a folding device (6) being used to control the lock device (5) for locking or releasing the upper joint (12) and the lower joint (14), wherein the folding device (6) comprises a connecting seat (61) arranged on the rear pipe (4), a lever (62) connected pivotally to the connecting seat (61), a wire (63) whereof one end is connected with a lower end of the lock device (5) and whereof the other end is connected with a front end of the lever (62), and a lifting belt (64) connecting with a rear end of the lever (62); the connecting seat (61) is provided with first release components (8) to control and lock the lever (62) in case of movement; the baby stroller is being folded by raising the lifting belt (64) to drive the lever (62) rolling back the wire (63) resulted in the lock device (5) being moved downward for releasing upper joint (12) and lower joint (14), and collapsing into a flattened position with weights thereof.

2. A baby stroller capable of being folded with one hand according to claim 1, which is characterized in that the lock device (5) comprises a sleeve (51) arranged on the joint seat (11) and position below the upper joint (12) and the lower joint (14), a spring (52) disposed inside the sleeve (5) and a pin (53) positioned at an upper of the sleeve (51) for locking the upper joint (12) and the lower joint (14), one end of the lever being connected with the sleeve (51); the upper joint (12) and the lower joint (14) whereof lower ends are respectively provided with a first slot (121) and a second slot (141) matched with the pin (53), and the pin (53) is also matched with an aperture (115) arranged on for locking the upper joint (12) and the lower joint (14).

3. A baby stroller capable of being folded with one hand according to claim 2, which is characterized in that the joint seat (11) comprises a base (111), a first connecting board (112) and a second connecting board (113) disposed on two sides of an upper part of the base (111), and an installation space (110) arranged between the first connecting board (112) and the second connecting board (113) for receiving the upper joint (12), the annular pressing block (13) and the lower joint (14); the upper joint (12) and the lower joint (14) are respectively provided with a first sliding opening (122) and a second sliding opening (142); when in installation, the annular pressing block (13) is mounted to the upper joint (12) and the lower joint (14), and embedded on the installation space (110), then fixed by rivets (114) passing through the first connecting board (112), the first sliding opening (122) of the upper joint (12), a through hole of the annular pressing block (13), the second sliding opening (142) of the lower joint (14) and the second connecting board (113) in sequence.

4. A baby stroller capable of being folded with one hand according to claim 3, which is characterized in that the sleeve (51) is provided with a space (511) for receiving the spring (52) and a notch (512) disposed below the space (511); the base (111) is provided with a sliding room communicated with the installation space (110) and received the sleeve (51), and an orifice (116) corresponded to a lower part of the sleeve (51) and arranged on the notch (512), a bolt passed through the orifice (116) and the notch (512), and fixed in the base (111), wherein the bolt is being abutted on a lower end of the spring (52).

5. A baby stroller capable of being folded with one hand according to claim 1, which is characterized in that the lower joint (14) corresponded to the upper joint (12) is provided with a first containing groove (143) and a first convex ring (123), the annular pressing block (13) inserted into the first convex ring (123) and fitted in the first containing groove (143).

6. A baby stroller capable of being folded with one hand according to claim 5, which is characterized in that the first containing groove (143) whereof inner wall is provided with a first flange (144) having a first helical groove; the annular pressing block (13) whereof outer wall is provided with a first convex rib (131) matched with the first helical groove.

7. A baby stroller capable of being folded with one hand according to claim 6, which is characterized in that the first convex ring (123) whereof outside is provided with a second helical groove in the opposite direction to the first helical groove; the annular pressing block (13) whereof inner wall is provided with a second convex ring (132) matched with the second helical groove.

8. A baby stroller capable of being folded with one hand according to claim 1-7, which is characterized in that the first release components (8) comprises a left cover (81) and a right cover (82) that is arranged on the connecting seat (61) and matched to each other, a curb piece (83) used to control the lever (62) to prevent movement, a first button (84) used to drive the curb piece locking or releasing from the lever (62), a first spring (85) arranged between the curb piece (83) and the left cover (81), a second spring (86) arranged on the first button (84), and a block (841) used to control the lever (62) to prevent movement; a third slot (622) and a fourth slot (623) are respectively arranged on the front end of the curb piece (83) and the first button (84).

9. A baby stroller capable of being folded with one hand according to claim 8, which is characterized in that the lever (62) whereof front end is further provided with a wire trench (621) matched with the wire (63).

10. A baby stroller capable of being folded with one hand according to claim 1, which is characterized in that the joint seat (11) whereof outside is further provided with an outer case (15) and inner case (16) for covering the joint seat (11) thereof; the outer case (15) whereof an outside is provided with a lid (17) having a plurality of buckles (171) thereon and holes matched with the buckles (171).

* * * * *